US012290738B2

(12) United States Patent
McCartin

(10) Patent No.: US 12,290,738 B2
(45) **Date of Patent: *May 6, 2025**

(54) METHOD AND ELECTRONIC DEVICE FOR IDENTIFYING GOLF SWINGS AND TRACKING STATISTICS DURING A GOLF ROUND

(71) Applicant: COLLATERAL OPPORTUNITIES, LLC, Wilmington, DE (US)

(72) Inventor: Michael McCartin, Washington, DC (US)

(73) Assignee: COLLATERAL OPPORTUNITIES, LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/389,156

(22) Filed: Nov. 13, 2023

(65) Prior Publication Data

US 2024/0149137 A1 May 9, 2024

Related U.S. Application Data

(63) Continuation of application No. 17/383,932, filed on Jul. 23, 2021, now Pat. No. 11,813,514, which is a continuation of application No. 16/600,018, filed on Oct. 11, 2019, now Pat. No. 11,071,902, which is a continuation of application No. 14/740,020, filed on Jun. 15, 2015, now Pat. No. 10,456,657.

(60) Provisional application No. 62/012,676, filed on Jun. 16, 2014.

(51) Int. Cl.
*A63B 71/00* (2006.01)
*A63B 71/06* (2006.01)

(52) U.S. Cl.
CPC ................................ *A63B 71/0669* (2013.01)

(58) Field of Classification Search
CPC ............................ A63B 69/36; A63B 71/0669
See application file for complete search history.

(56) References Cited

U.S. PATENT DOCUMENTS

2012/0052971 A1* 3/2012 Bentley ............. A63B 24/0006 473/222

* cited by examiner

*Primary Examiner* — Omkar A Deodhar
(74) *Attorney, Agent, or Firm* — DANIEL S. POLLEY, P.A.

(57) ABSTRACT

A system and method for automatically identifying a golf swing without any active participation on the part of the golfer is disclosed. The application program stored on and operating from an electronic device system uses data from a gyroscope and accelerometer to identify the golf swing. The system also automatically keeps statistics about the golfer's round of golf based on the GPS location of the identified swings.

19 Claims, 7 Drawing Sheets

Server
122
Public Network
124
Processor
102
104
Network Communication Hardware
106
Gyroscope
120
118
Memory
Electronic file
Application Program
110
Accelerometer
108
112
Global Positioning System Unit
116
114
Interactive Display
100

Start
F1a
Query User to take Calibration Swings and Accept
No
F1b
Accept Swings?
F1c
Yes
Record and Update User Swing Data

METHOD AND ELECTRONIC DEVICE FOR IDENTIFYING GOLF SWINGS AND TRACKING STATISTICS DURING A GOLF ROUND

This application is a continuation of U.S. application Ser. No. 17/383,932, filed Jul. 23, 2021, which is a continuation of U.S. application Ser. No. 16/600,018, filed Oct. 11, 2019, now U.S. Pat. No. 11,071,902 which is a continuation of U.S. application Ser. No. 14/740,020, filed Jun. 15, 2015, now U.S. Pat. No. 10,456,657, which claims the benefit of and priority to U.S. Provisional Patent Application Ser. No. 62/012,676, filed Jun. 16, 2014. All of the above applications are incorporated by reference in their entireties for all purposes.

TECHNICAL FIELD

The present disclosure relates to methods and electronic devices for identifying golf swings and tracking statistics during a round of golf.

BACKGROUND

There are an estimated 24.1 million golfers in the United States, making it among the most popular sports in the country. Golf is a sport driven by statistics, and there is significant demand in the golf community for personalized golf statistics. Typically, golfers manually keep track of records such as scores, greens in regulation, length of shots, and fairways hit. Such manual record keeping is subject to guesswork and human error. To alleviate these problems, automated techniques have been developed. These methods have their own drawbacks, however. Automated techniques for recording golf statistics typically require wearable devices, including those attached to golf equipment or the player. Often these systems require an affirmative step before each golf shot, and significant time after the round to upload and capture the data.

Hybrid solutions have been developed using smartphones, but such systems typically require manual entry of data by the user during or after the round, or require active use while on the course. Furthermore, many golfers have a negative association with actively using cell phones and other technology during a round.

SUMMARY

The disclosure describes a novel electronic/software based system and method for automatically identifying a golf swing without any active participation on the part of the golfer with the system and method, other than the golfer carrying with him or her, the electronic device that the system and application program are stored on. In a preferred but non-limiting embodiment, the electronic device can be a smartphone or smart watch. The application program stored on and operating from an electronic device system uses data from a gyroscope and accelerometer to identify the golf swing. The gyroscope and accelerometer can also be part of the smartphone or smart watch. The application program cross references/compares a golfer's potential swing against/with a calibrated process to eliminate false positives using built-in logic. The system and method also automatically keeps statistics about the golfer's round of golf based on the GPS location of the identified swings and logic to eliminate practice swings.

BRIEF DESCRIPTION OF THE DRAWINGS

While the appended claims set forth the features of the present techniques with particularity, these techniques may be best understood from the following detailed description taken in conjunction with the accompanying drawings of which:

DETAILED DESCRIPTION

The disclosure is directed to a method and electronic device ("device") that passively compiles statistical information during a round of golf. Possible embodiments of the device include a smartphone or similarly enabled device worn by a user (such as in a pants pocket, holstered to the golfer's belt, on a wrist, etc.). In various embodiments, an application executing on the device analyzes data from a gyroscope sensor, accelerometer sensor, and global positioning system ("GPS") capabilities within the device itself as well as information from other personal electronic devices to automatically record golfing statistics. These statistics include, but are not limited to: driving distance, number of putts, approach distance, shot dispersion, fairways hit, greens in regulation, approach accuracy from different yardages, longest drive, individual round vs. historical performance, and personalized trend analysis.

When swinging a club, the motion of a user's body can be measured by the gyroscope and accelerometer sensors present within the device. The golf swing motion creates a distinct pattern in the gyroscope and accelerometer sensor data that is distinguishable from other motions a golfer makes while on the golf course. The device monitors these instruments until it identifies readings consistent with a golf swing. When calibrated to the user, a built in logic engine (executing as part of the application) eliminates false positives and practice swings, ensuring that only true swings are recorded by the application. Using the GPS data, the application can track shot location within feet, allowing for real-time monitoring, recording, and tracking of personalized golf scores and statistics.

Figure 1A:
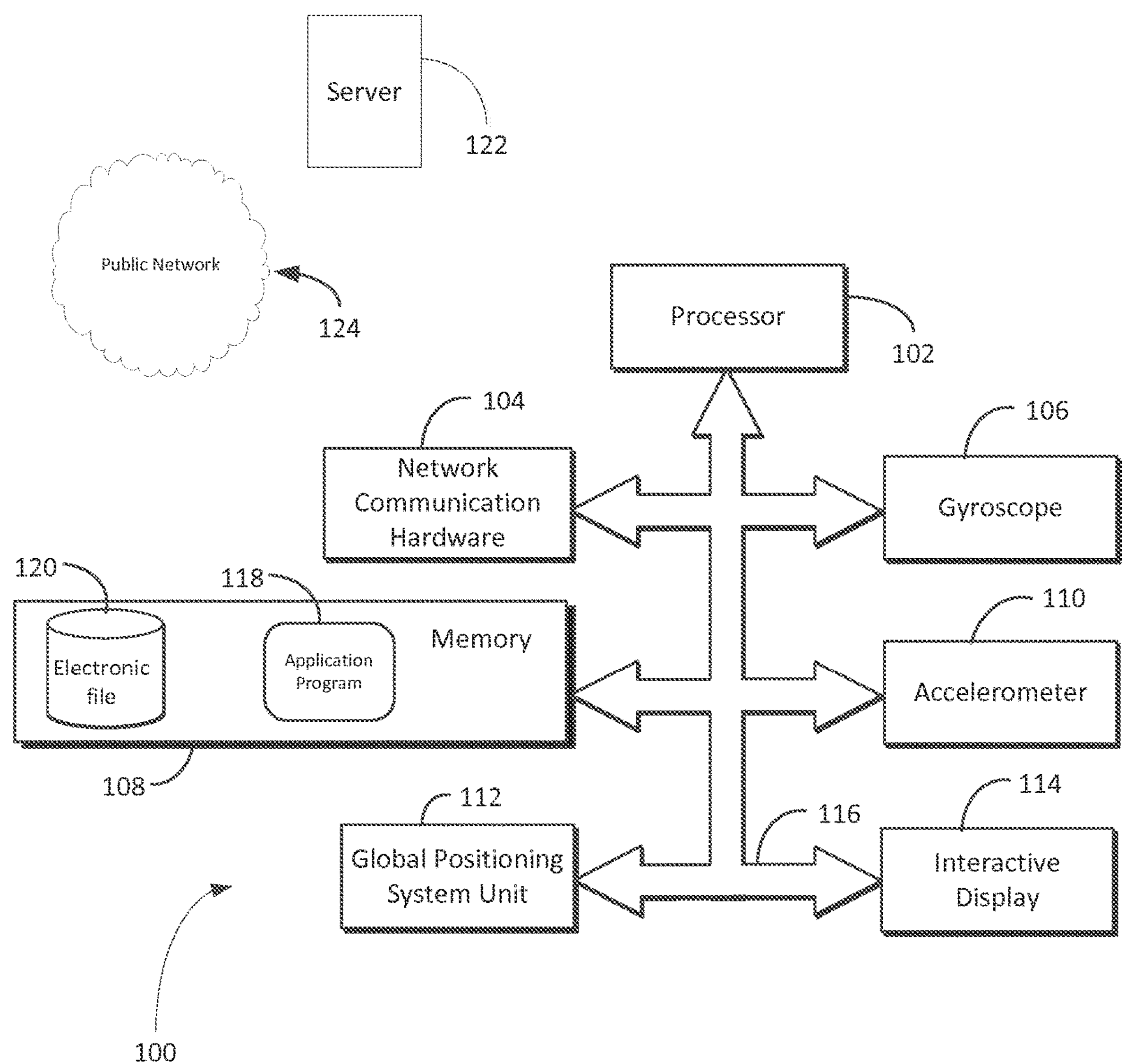
FIG. 1A is a block diagram that shows example components of the electronic device.

Turning to FIG. 1A, an embodiment of the electronic device, generally labeled 100, includes a processor 102, network communication hardware 104 (e.g., WiFi chip or a cellular baseband chipset), a gyroscope 106, a memory 108, an accelerometer 110, a GPS unit 112, and an interactive display 114 (e.g., a touchscreen, etc.). Each of the elements of FIG. 1A is communicatively linked to one or more other elements via one or more data pathways 116. Possible implementations of the data pathways 116 include, without limitation, wires, conductive pathways on a microchip, and wireless connections. Possible implementations of the processor 102 include, without limitation, a microprocessor, microcontroller and a controller. In various embodiments, the processor 102 retrieves instructions and data from the memory 108 and, using the instructions and data, carries out many of the methods described herein. Among the possible instructions that the processor 102 carries out include those of an application program 118. Thus, when this disclosure refers to the application program 118 carrying out an action, it is, in many embodiments, the processor 102 that actually carries out the action (in coordination with other hardware components of the device 100 as necessary).

The memory 108 can be implemented as volatile memory, non-volatile memory, or a combination thereof. The memory 108 may be implemented in multiple physical locations and across multiple types of media (e.g., dynamic random access memory plus a hard disk drive, cloud based, etc.).

In an embodiment, the application program 118 monitors the accelerometer 110 and the gyroscope 106 to determine when the user has taken a shot, as will be described below in further detail in conjunction with FIGS. 3-5. Once the application program 118 detects a shot, the application program 118 records the shot's location based on the user's location using the GPS unit 112. The application program 118 will automatically calculate any pertinent golf statistics such as, but not limited to, shot distance, whether a shot was out-of-bounds or in a hazard, driving distance, number of putts, approach distance, shot dispersion, fairways hit, greens in regulation, approach accuracy from different yardages, longest drive, and further personalized golfing statistics. Optionally, the user may add events (e.g., via the interactive display 114) such as penalty strokes or notes to account for certain hazards and drops. The application program 118 saves this data to an electronic file 120. User inputs are optional if the user wishes to add events. These can be inputted by the user on the device 100 directly.

The application program 118 uses the GPS unit 112 to obtain the user's location when the application 118 detects a swing or putt. The application program 118 also uses the GPS unit 112 to determine where on the course the user has made a shot. This application program 118 uses the data to determine the user's score and other personalized statistics. This process is described in further detail below in conjunction with FIG. 4.

By using the network communication hardware 104, the application program 118 can communicate with a remotely located server 122 over a public network 124 (e.g., the Internet). The server 122 (which has a database of golf courses and their layouts) will provide the application program 118 with updated data on the golf course on which the user is playing.

Figure 1B:
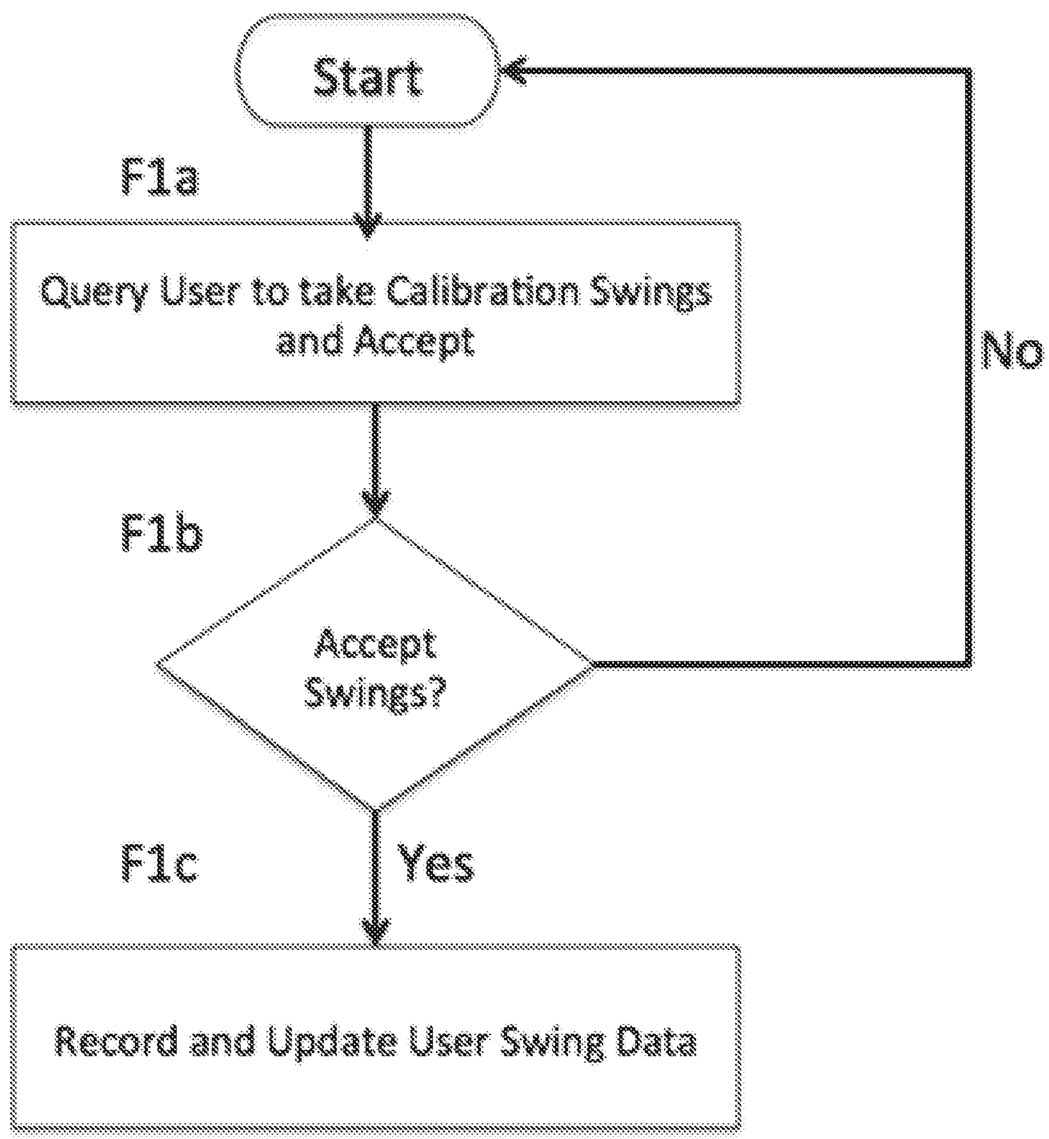
FIGS. 1B, 2, 3, and 4 are flowcharts showing various functions of the electronic device.

Turning to FIG. 1B, actions carried out by the device 100 to calibrate the application program 118 in an embodiment are as follows. At F1*a*, the application program 118 prompts the user to take swings to calibrate the application program 118.

The application program 118 asks the user (via the interactive display 114) to take three calibration full swings, three calibration chip shots, and three calibration putts with the device on their person. The application program 118 records the sensor readings from the gyroscope 106 and accelerometer 110 before, during, and after each swing. The gyroscope 106 measures the rotation of the device 100 along the x, y, and z-axis. The accelerometer 110 measures the magnitude of g-force acceleration exerted on the device 100 during a swing.

At F1*b*, the application program 118 queries the user to find out whether the swings were performed correctly. If the user inputs an affirmative response, the process moves to F1*c*, at which the application program 118 saves the gyroscope and accelerometer readings taken during the calibration swings to an electronic file 120 in the memory 108. The application program 118 will eventually use these readings as a baseline to detect when the user makes subsequent swings and to eliminate false positives. If the user inputs a negative response, the calibration process returns to F1*a*.

Figure 2:
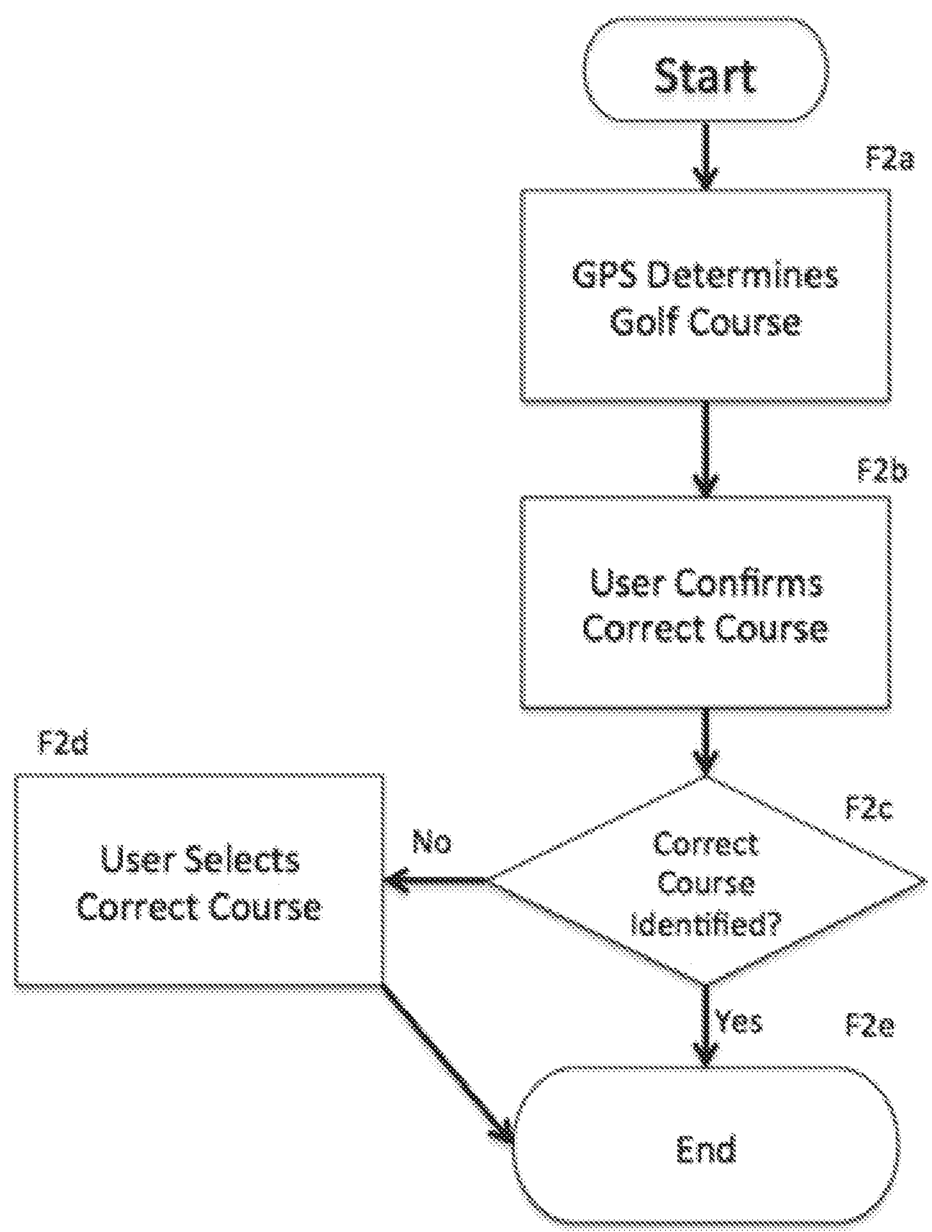

Turning to FIG. 2, actions carried out by the device 100 to determine the golf course on which the user is playing in one non-limiting embodiment are as follows. At F2*a*, when the application program 118 is initialized, the application program 118 uses data from the GPS unit 112 to determine the user's location. Based on the user's GPS coordinates, the application program 118 will automatically contact the server 122 to search an indexed database of known golf courses and determine which course the golfer is playing preferably based on the user's location information.

At F2*b*, the application program 118 prompts the user to confirm that the application program 118 has correctly identified which course the user is playing on. This will be most useful at locations with multiple golf courses. However, it is within the scope of the disclosure that the application program can recognize which course from multiple golf courses, where the GPS data information provides a precise or almost precise geographical spot of the user's exact location, such that the user's location is matched to a specific one of the multiple golf courses at the general location (e.g. country club with two or more 18 hole courses, etc.).

At F2*c*, the application program 118 receives the user's response to the prompt of F2*b*. If the user responds affirmatively, the process moves to F2*e*, at which the application program 118 downloads from the server 122 (via the network 124) the relevant course information in order to keep the user's statistics in the manner described in FIGS. 3-5. The course information can include a map of the golf course with the locations of relevant golf course features. These locations include but are not limited to: tee-boxes, fairways, greens, bunkers, holes, and/or out-of-bounds locations.

If the user inputs a negative response, the process moves to F2*d*, at which the application program 118 prompts the user to select the correct golf course from choices provided by the application program 118. The process then moves to F2*e*, at which it ends.

Figure 3:
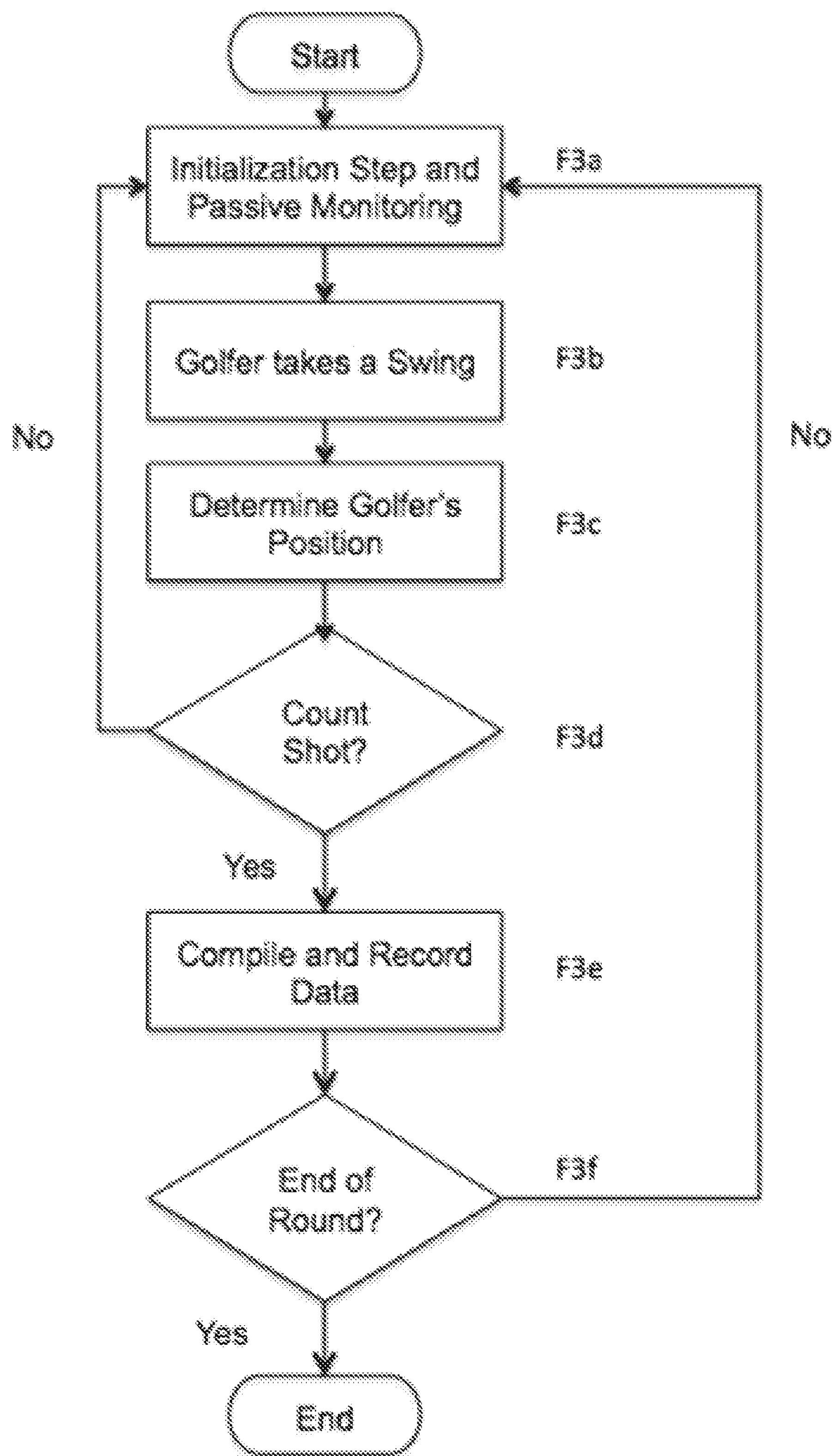

Turning to FIG. 3, actions carried out by the device 100 to record the user's golf swings during a round in one non-limiting embodiment are as follows. At F3*a*, using the method described in conjunction with FIG. 2, the application program 118 automatically determines which course on which the user is playing. The application program 118 continuously monitors the gyroscope 106 and accelerometer 110 to determine when the user takes a swing.

At F3*b*, when the gyroscope 106 detects rotational movement around the x, y, or z-axis of the device 100 (otherwise known as roll, pitch, and yaw), the application program 118 automatically measures and records that rotation. The application program 118 then compares these measurements to those taken during the user's calibration shots. For example, during a typical full swing, the gyroscope's y-axis shows a rapid increase in amplitude. A corresponding but smaller increase in the amplitude of the x and z-axis is consistent with the characteristics of a full swing.

If there is a match or near-match between the rotation of the device 100 during a shot and the rotation of the device 100 during a calibration swing, the application program 118 also compares the acceleration (as measured by the accelerometer 110) of the recorded movement to the calibration swings. If the readings from both the gyroscope 106 and the accelerometer 110 match or nearly match the readings of the gyroscope 106 and the accelerometer 110 taken from a calibration swing, then the application program 118 records that the user has taken a potential shot. If there is not a match, then no stroke is recorded, and the application program 118 resumes monitoring. This eliminates false-positives and movements other than golf swings from being recorded as a swing.

At F3*c*, once the application program 118 detects a potential shot, the application program 118 obtains the user's location from the GPS unit 112 and records the location of the potential shot.

At F3*d*, the application program 118 determines whether to count the shot. If the application program 118 detects one or more potential shots within predetermined time and/or distance parameters, the application program 118 preferably only records the latest shot in time in the user's statistics. The application program 118 will consider any prior potential shot occurring within these parameters to be a practice swing, and thus will not include such shots in the user's score or statistics.

At F3*e*, if there are no further potential shots made within a predetermined time and distance of a detected shot, the application program 118 records a shot as having been taken at that location (a recorded shot). The application program 118 records the shot's GPS location, adds the shot to the golfer's score and statistics, and saves the updated statistics to the electronic file 120. By using the GPS unit 112 to determine shot location, and using the gyroscope 106 and accelerometer 110 to determine when a shot has been made, the application program 118 will automatically determine statistics such as, but not limited to, driving distance, number of putts, approach distance, shot dispersion, fairways hit, greens in regulation, approach accuracy from different yardages, longest drive, and further personalized golfing statistics. An embodiment of such a determining process is further described in conjunction with FIG. 4.

At F3*f*, the application program 118 will determine whether the round is over. If there are no further potential shots made within a predetermined time after a recorded shot has been made at the final hole of the course, the application program 118 will determine that the user has ended his or her round and, using the GPS coordinates of all previous shot locations, calculate all relevant golf statistics for the round as well as comparisons to prior rounds at the same course and other courses. Otherwise, the process returns to F3*a*. Optionally, the user can also input on the interactive display that the round of golf has ended which can also automatically cause application program 118 to calculate the relevant golf statistics.

Figure 4:
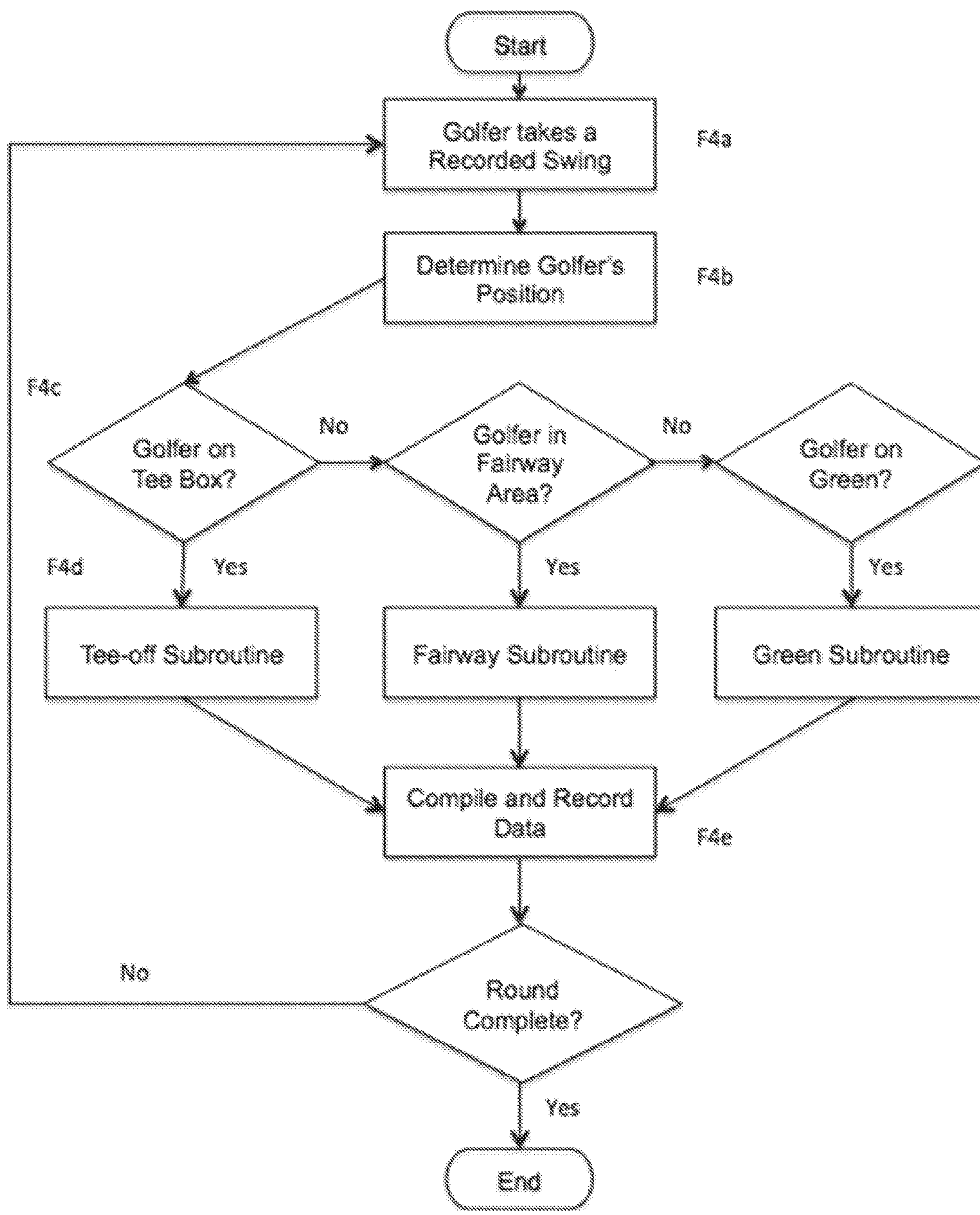

Turning to FIG. 4, actions carried out by the device 100 to use GPS data to determine golf statistics in an embodiment are as follows. At F4*a*, the application program 118 carries out the process described in conjunction with FIG. 3. At F4*b*, when the application program 118 detects a shot, the application program 118 obtains the user's location from the GPS and records the location of the shot. At F4*c*, based on the GPS coordinates, the application program 118 uses the location of the recorded shot to determine the type of shot the user made (e.g., drive, putt, or chip). The application program 118 uses data from the server 122 to determine the hole on which the user is playing, where on that particular hole the user's recorded shot was made, and whether the hole is a par 3, 4, or 5. The application program 118 keeps different statistics based on both the length of the hole, and the type of recorded shot the golfer makes. To determine what type of shot the user made, the application program 118 uses data from the GPS unit 112 to determine whether the shot was made from the tee box, the green, or any other location on the course, such as a fairway or rough.

At F4*d*, when a recorded shot is made from inside the tee box, the application program 118 recognizes that the user has begun playing a new hole, compiles the statistics from the previous hole, and begins to record statistics for the new hole. Based on the par for each hole, the application program 118 automatically tracks different statistics (e.g., driving distance is not tracked on a par 3 hole, but is for par 4 and 5 holes). When a recorded shot is made from the tee box on a par 4 or 5 hole, the location of the subsequent recorded shot allows the application program 118 to determine statistics such as driving distance and accuracy automatically. When a recorded shot is made from the tee box on a par 3 hole, the location of the subsequent recorded shot, chip, or putt (as obtained from the GPS unit 112) allows the application program 118 to determine statistics such as greens in regulation automatically.

Thus in one non-limiting embodiment, preferably for the tee shot on par 4 or 5 holes (though the technology could be used to determine the length of any golf shot, the GPS data determines the location where the golfer performs the first true golf swing for the tee shot and then determines the location that the golfer performs his or her next second true golf swing which should be the location of the golf ball on the particular hole from the tee shot. The distance between these two locations provides the distance that the golf ball traveled from the golfer's tee shot and can be used for calculating driving statistics. As mentioned above, this calculating technique can be used to calculate the distance any golf shot achieved, through the use of the GPS location of the golfer at consecutive true golf swings.

When a recorded shot is made from a location other than the tee box or green, the application program 118 can determine whether the golfer's prior shot finished within or missed the fairway. This information allows the application program 118 to automatically compile statistics at the end of the round such as fairways hit, greens in regulation, tee shot dispersion, and approach shot dispersion. For shots within a pre-determined distance of the hole, the application will calculate chipping accuracy and scrambling as well.

When a recorded shot is made from a green and/or the location of record putts on the green, allows the application program 118 to keep track of putting statistics, such as up-and-downs and lengths of putts.

At F4*e*, after the first hole, when a recorded shot is made from the tee box, the application program 118 compiles the GPS location of all recorded shots made during the prior hole. This allows the application program 118 to determine all applicable golf statistics automatically. Possible statistics include, without limitation: approach distance, shot dispersion, fairways hit, greens in regulation, approach accuracy from different yardages, longest drive, and further personalized golfing statistics. Once the user completes the final hole of the course, the application program 118 tabulates statistics for the entire round, and can compare statistics between previously played rounds for the same golf course or other golf courses.

Figure 5:
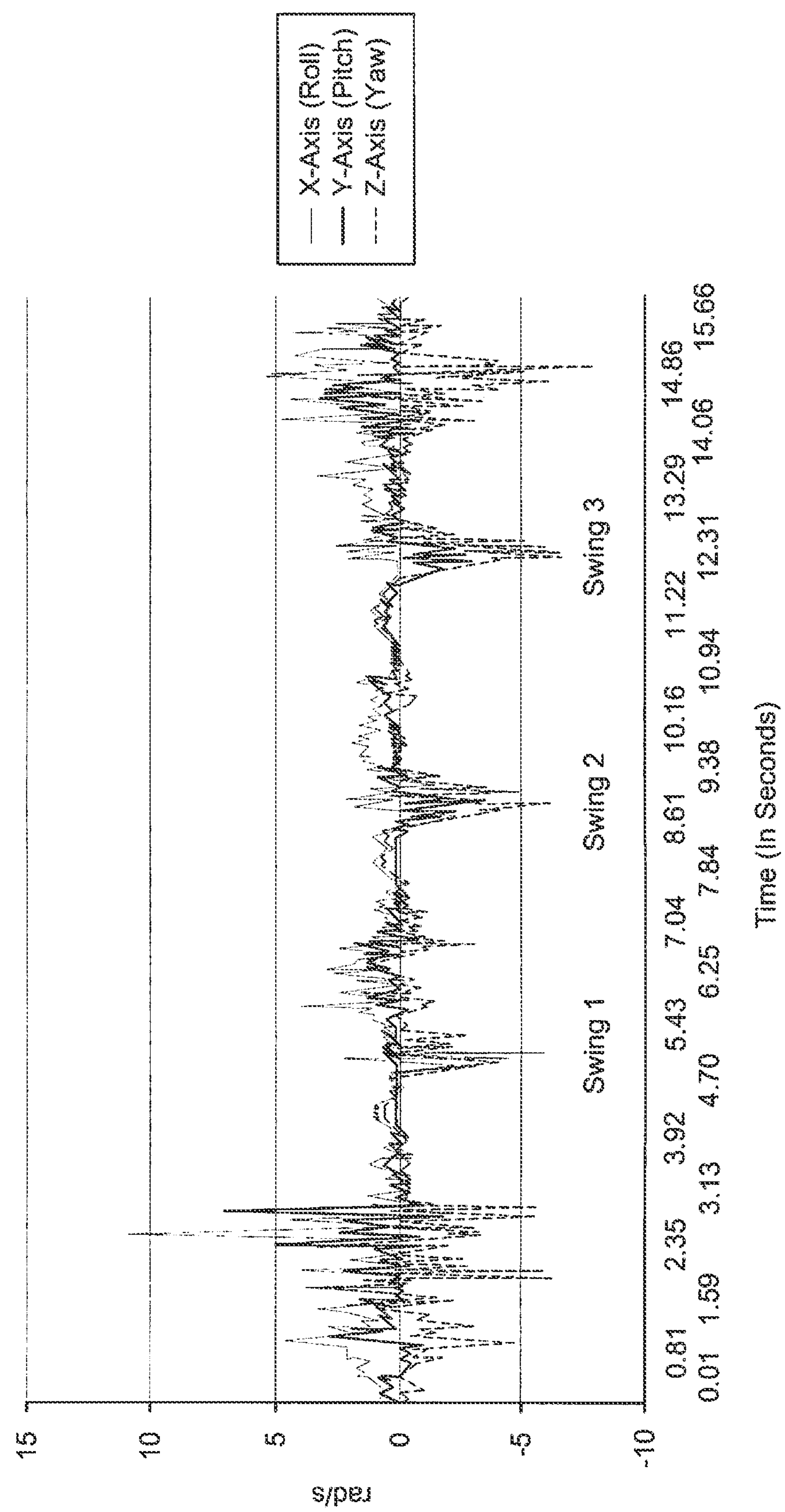
FIGS. 5 and 6 show how different swings can be distinguished based on gyroscope readings.

FIG. 5 shows an example of how the application program 118 can identify a full swing using the readings of the gyroscope 106. During a full swing, the primary indicator for detecting a swing is the y-axis data from gyroscope 106. The baseline reading of each axis is 0 radians per second (rad/s). During a golfer's backswing, there is generally rotational movement consistently around 1 rad/s. The through-swing shows a consistent max amplitude of about 6 or more rad/s. The x and z-axis data consistently oscillates similarly to the y-axis, but to a lesser magnitude.

Using the unique motion of each user's swing, the application will be able to identify swings based on the readings from the gyroscope, and subsequently confirm that a swing took place using data from the accelerometer. When the application program 118 detects a swing, it takes the GPS coordinates of the golfer's location and records them, thus automatically tracking the location of shots taken during a round.

Figure 6:
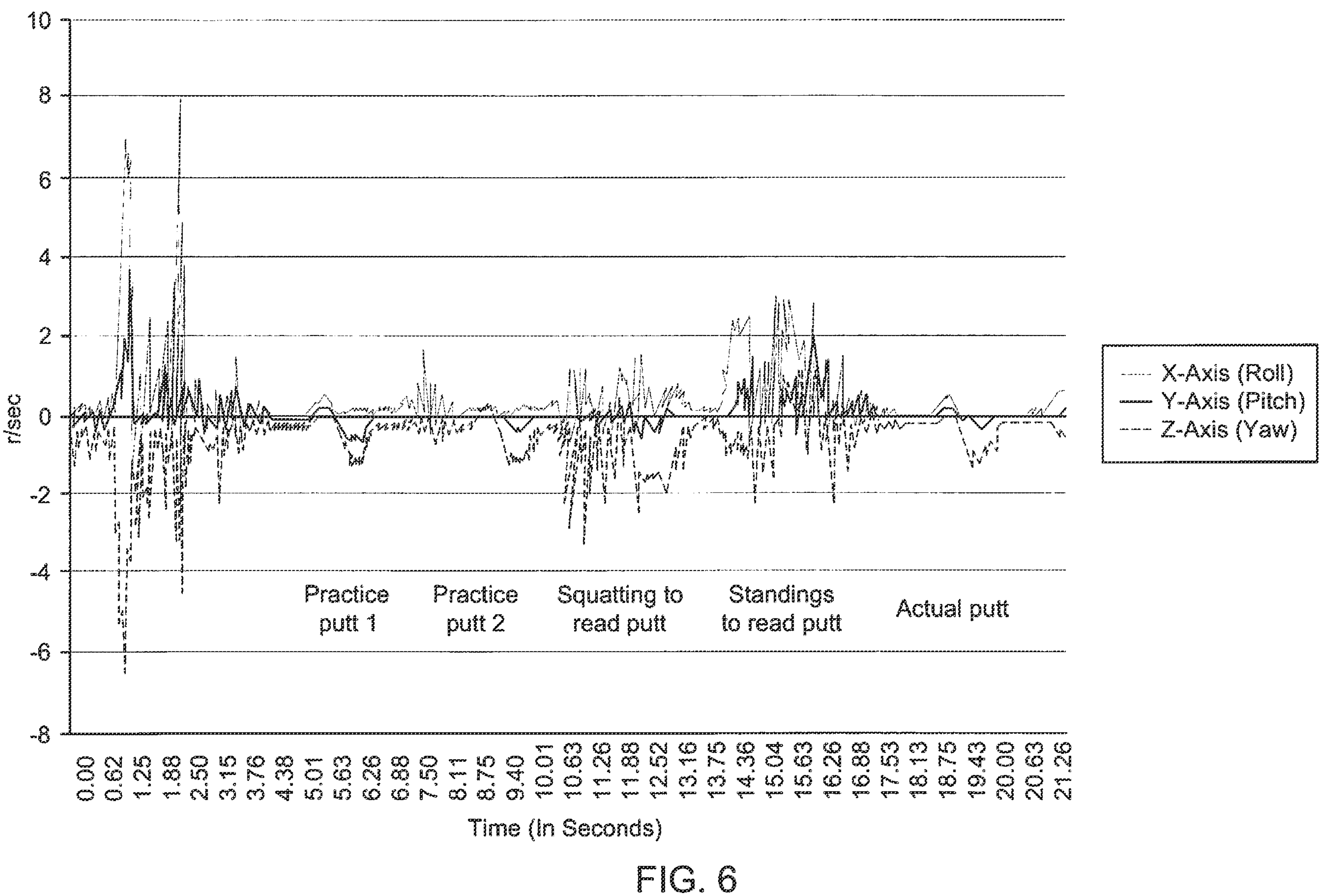

FIG. 6 shows an example of how the application program 118 can identify a putt using the gyroscope readings from the device. During a putt, the gyroscope data appears as a low amplitude version of a full swing, but with far less z-axis rotation. Typical motions during a putting routine, including squatting behind the ball and picking up the ball to mark its location, create distinctive gyroscope and accelerometer data patterns. Using the unique motion of each user's body during a putt, the application program 118 will be able to identify putts based on the readings from the gyroscope 106, and subsequently confirm that a swing took place using data from the accelerometer 110. Just as with full swings, when the application program 118 detects a putt, the application program 118 obtains the GPS coordinates of the user's location and records them, thus automatically tracking the location of shots taken during a round. As an additional option, to further confirm that a putt has taken place, the application program 118 can use the match the GPS coordinates of the user's location to the information stored/obtained regarding the golf course being played to confirm that the GPS coordinates place the golfer on the green or just off the green where the golfer may still take a putt shot.

In various embodiments, the methods and electronic device described herein may provide a golfer with highly accurate and personalized statistics. It will provide the golfer with significant advantages over existing scorekeeping and statistical tracking methods. These include: (1) The application program 118 can be run on a smartphone, which 3 out of 4 golfers already own, therefore negating the need for expensive additional technology. (2) The application program 118 compiles statistical information automatically, eliminating guesswork and/or distractions from a golfer's focus on the course. (3) The application program 118 provides golfers with extensive statistical information automatically, eliminating the need for an affirmative step during a round. (4) The application program 118 eliminates the stigma of actively using technology during a round to compile statistical data. (5) The application program 118 uses the GPS unit 112 to automatically determine shot distance and other statistics, giving the user more accurate information than estimating from yardage markers. (6) The application program 118 tracks the golfer's statistics from round to round, allowing the golfer to use the application program 118 to improve his or her golf game.

The following table explaining some of the terms used herein is provided for ease of reference.

| | |
|---|---|
| Accelerometer | An electronic component that detects acceleration. Typically can detect acceleration on two or three axis, allowing it to sense motion and orientation. |
| Gyroscope | A component that measures the orientation of the device. It can sense motion and rotation along the device's x, y, and z-axis. |
| Global Positioning System ("GPS") | A global system of navigational satellites developed to provide precise positional and velocity data used to determine the position of anyone or anything equipped with a GPS enabled device. |
| Smartphone | A device that combines a cellular phone with additional technology including but not limited to: internet access, an accelerometer, a gyroscope, and GPS capability. |
| Par | The number of strokes a skilled golfer should take to get the ball from the tee into the hole for a particular golf hole. |
| Greens in Regulation | A statistic used for describing in percentage terms the number of times a player gets his or her ball onto the putting surface in two shots fewer than the par for the hole. |
| Practice Swing | A swing made by a golfer prior to striking the ball, which does not count towards his or her score. |
| Driving Distance | The measure of distance of the first shot made on a par 4 or par 5 hole. |
| Number of Putts | The number of strokes taken by a golfer once the ball has reached the putting green. |
| Approach Shot | A shot from the fairway intended to reach the green or the hole. |
| Shot Dispersion | A measure of the precision of shots made with the same club directed at the same target. |
| Fairways Hit | The percentage of times a golfer's first shot on a par 4 or par 5 lands on any part of the fairway. |
| G-Force | A force acting on a body as a result of acceleration or gravity, informally described in units of acceleration equal to one g. |
| Calibration Swing | A swing made by the golfer to calibrate the application. |
| Amplitude | The maximum extent of a vibration or oscillation, measured from the position of equilibrium. |
| X-Axis (Roll) | The twist or oscillation around an axis parallel to the direction of motion. |
| Y-Axis (Pitch) | The twist or oscillation around a horizontal axis. |
| Z-Axis (Yaw) | The twist or oscillation around a vertical axis. |
| Potential Shot | A shot made by the golfer which may or may not count towards the golfer's statistics. |
| Recorded Shot | A shot made by the golfer that the application has determined will count towards the golfer's statistics. |
| Tee Box | The area at the start of a hole from which a golfer's first stroke is taken. |
| Fairway | The portion of a golf course between a tee box and the corresponding green, with shorter grass than the surrounding area. |
| Rough | The portion of a golf course outside of the fairways that generally has taller or thicker grass than the fairway. |

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

All components of the described system and their locations, electronic communication methods between the system components, electronic storage mechanisms, etc. discussed above or shown in the drawings, if any, are merely by way of example and are not considered limiting and other component(s) and their locations, electronic communication methods, electronic storage mechanisms, etc. can be chosen and used and all are considered within the scope of the disclosure.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

While the system and method have been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A computer-program product for use in conjunction with an electronic device, the computer-program product comprising a non-transitory computer-readable storage medium and a computer-program mechanism embedded therein, for use in identifying when a golfer takes a real golf swing as opposed to a practice golf swing during a game of golf, the computer-program product including:

instructions for receiving digital data representing a plurality of golf swings performed by the golfer prior to the game of golf;

instructions for receiving electronic approval of the golf swings from the golfer;

instructions for receiving data from a gyroscope and an accelerometer disposed within the electronic device when the golfer takes a golf swing during the game of golf and only after receiving electronic approval from the golfer;

instructions for electronically comparing the received data for the golf swing taken during the game of golf against the digital data that was approved by the golfer; and instructions for counting the golf swing as a real golf swing during a current game of golf where the received data matches or is within a predetermined threshold or percentage of one of the golf swings represented by the digital data previously received and approved by the golfer.

2. The computer-program product of claim 1 wherein the instructions for receiving digital includes:

instructions for electronically prompting the golfer to take a plurality of golf swings;

instructions for electronically recording the readings or data from the gyroscope and accelerometer before, during and after each golf swing to measure a rotation of the electronic device along an x, y and z-axis and a magnitude of g-force acceleration exerted on the electronic device during each golf swing; and instructions for electronically saving the readings or data from the golf swings to an electronic file of a memory component.

3. The computer-program product of claim 2 wherein the instructions for electronically prompting includes instructions for prompting the golfer to take a plurality of full golf swings, a plurality of chip shot golf swings and a plurality of putting golf swings.

4. The computer-program product of claim 2 wherein the instructions for receiving electronic approval includes instructions for electronically querying the golfer to indicate either yes or no or an equivalent thereto as to whether the plurality of golf swings are acceptable to the golfer and instructions for electronically receiving either (I) an affirmative response from the golfer or (II) a negative response from the golfer.

5. A computer-program product for use in conjunction with an electronic device, the computer-program product comprising a non-transitory computer-readable storage medium and a computer-program mechanism embedded therein, for recording a golfer's golf swings during a round of golf, the computer-program product including:

instructions for receiving GPS coordinates for a specific golf course while the golfer is at the specific golf course but prior to the golfer beginning a game of golf at the specific golf course;

instructions for automatically and electronically determining a specific golf course based on the GPS coordinates received prior to the golfer beginning a game of golf at the specific golf course;

instructions for comparing measurements obtained from a gyroscope contained within the electronic device for golf swings taken by the golfer during the game of golf to previously stored measurements from the gyroscope representing real golf swings by the golfer taken prior to beginning the game of golf;

when a match is determined from comparing measurements, instructions for electronically recording that a potential golf shot has been taken by the golfer; and instructions for determining whether to count the potential golf shot as an actual golf shot for a round of golf that the golfer is currently participating in.

6. The computer-program product of claim 5 further including instructions for electronically obtaining a current location for the golfer on the golf course from location data received from a GPS unit contained within the electronic device.

7. The computer-program product of claim 5 wherein the instructions for receiving GPS coordinates and the instructions for automatically and electronically determining a specific golf course include:

instructions for receiving GPS location data for the golfer from a GPS unit contained within the electronic device;

instructions for electronically contacting a server to search an indexed database of known golf courses with the GPS location data; and instructions for electronically receiving electronic information from the server identifying a specific golf course associated with the GPS location data.

8. The computer-program product of claim 7 further including instructions for electronically querying the golfer to ask if the specific golf course identified by the server is the golf course that the golfer is currently playing on or about to play on and instructions for electronically receiving an affirmative response from the golfer.

9. The computer-program product of claim 5 wherein the step for determining whether to count the potential golf shot includes:

instructions for detecting whether or not there are any other potential golf shots within a predetermined time or distance from the potential golf shot, if there are no other potential golf shots are detected, instructions for automatically recording the potential golf shot as an actual golf shot taken by the golfer for the current round of golf; or within the predetermined time or distance from the potential golf shot, if one or more other potential golf shots were detected, instructions for automatically recording the latest golf shot in time as the actual golf shot taken by the golfer for the current round of golf.

10. The computer-program product of claim 9 further including:

instructions for electronically obtaining a current location of a golf ball from an actual recorded golf shot from location data received from a GPS unit contained within the electronic device;

instructions for electronically adding information regarding the actual golf shot to a previously saved score and previously saved statistics for the golfer for the current round of golf resulting in an updated score and updated statistics; and instructions for electronically saving the updated score and updated statistics to an electronic file of a memory component by the application program.

11. The computer-program product of claim 10 further including instructions for electronically determining if the current round of golf has ended by the application program.

12. The computer-program product of claim 11 wherein the instructions for electronically determining if the current round of golf has ended include instructions for electronically determining when no further potential shots have been detected by the application program within a predetermined time after an actual golf shot has been recorded at a final hole for the golf course.

13. The computer-program product of claim 12 further including instructions for calculating one or more golf statistics based on GPS golfer shot locations for the current round of golf.

14. A computer-program product for use in conjunction with an electronic device, the computer-program product comprising a non-transitory computer-readable storage medium and a computer-program mechanism embedded therein, for recording a golfer's golf swings during a round of golf and determining golf statistics for the golfer, said computer-program product including:

instructions for receiving GPS coordinates for a specific golf course while the golfer is at the specific golf course but prior to the golfer beginning a game of golf at the specific golf course;

instructions for automatically and electronically determining a specific golf course based on the received GPS coordinates prior to the golfer beginning a game of golf at the specific golf course;

instructions for electronically detecting by the application program when the golfer has taken a golf shot based on information received by the application program from a gyroscope and accelerometer contained within the electronic device;

instructions for electronically receiving current location data of the golfer for the detected actual golf shot from a GPS unit contained within the electronic device;

instructions for electronically recording the location of the actual golf shot; and instructions for electronically determining a type of shot the golfer made based on the location of the actual golf shot.

15. The computer-program product of claim 14 wherein the instructions for electronically determining a type of shot includes:

instructions for electronically determining whether the actual golf shot was taken by the golfer at a tee box area, fairway area, rough, out of bounds or green area for a golf hole; and instructions for electronically identifying the actual golf shot as a drive, putt or chip depending on which area of the golf hole was determined.

16. The computer-program product of claim 14 further including:

instructions for electronically determining by the application program which hole of the golf course the golfer is currently playing on or about to play on based on the received GPS data for the current location of the golfer and the golf course determined;

instructions for electronically determining from the received GPS data where on the determined hole did the golfer take the actual golf shot; and instructions for electronically determining whether the determined hole is a par 3, 4 or 5.

17. The computer-program product of claim 15 further including instructions for electronically compiling statistics for a previous hole to the hole the golfer is currently playing or about to play when an actual golf shot was determined to have been taken by the golfer from the tee box area.

18. The computer-program of claim 15 further including instructions for automatically determining driving distance and accuracy based on a location of a next subsequent detected actual golf shot by the golfer when the actual golf shot is taken from a tee box area for a par 4 or par 5 hole.

19. The computer-program product of claim 15 further including instructions for automatically determining greens in regulation based on a location of a next subsequent detected actual golf shot by the golfer when the actual golf shot is taken from a tee box area of a par 3 hole.

* * * * *